United States Patent Office 3,473,956
Patented Oct. 21, 1969

3,473,956
SHAPED POLYAMIDE COATED WITH THE SAME POLYAMIDE MODIFIED BY POLYALKYLENE OXIDES
James Eric McIntyre, Michael Mundie Robertson, and Geoffrey Alan Horsfall, Harrogate, England, assignors to Imperial Chemical Industries Limited, London, England, a corporation of Great Britain
No Drawing. Filed May 7, 1965, Ser. No. 454,187
Claims priority, application Great Britain, May 12, 1964, 19,736/64
Int. Cl. B32b 27/34; B44d 1/22; D06m 15/00
U.S. Cl. 117—138.8                                2 Claims

ABSTRACT OF THE DISCLOSURE

Shaped articles of polyamides, nylons, are coated with the same modified by polyoxyalkylene groups, sulfonic, phosphonic, carboxylic acid groups, salts of the latter, or silicon- or fluorine-based water repellant groups or polyhydroxylated polymers. These groups may be part of the chain (i.e. in a block copolymer) or on a terminal group or in a side chain (as in a graft) to the polyamide structure. A typical coating is made by condensing adipic acid, hexamethylene diamine and a poly(oxyethylene) diamine. The latter condensate is applied to a polyamide fabric and heated thereon.

---

This invention relates to a surface-modifying treatment of shaped articles, such as filaments, fibres, fabrics, films and the like, made from polyamides.

Surface treatment of shaped articles made from essentially linear crystallisable polyamides with agents for modifying the properties of the articles, particularly with anti-static agents is well known. There are in general two ways in which such treatment has been carried out: either the agents is permanently attached to the surface by newly-formed covalent bonds, as in the case of radical grafting and certain isocyanate treatments, or the agent is loosely held by polar or surface tension forces or other relatively low energy forces. Polyamides, because of their relatively non-polar nature, do not develop very high forces with agents for surface treatment in this second way, consequently it has proved difficult to carry out a surface treatment of polyamides to obtain an effect which is permanent and very resistant towards washing, scouring, dry-cleaning, and other processes to which the derived articles may be subjected. We have now discovered a method of modifying the surface of articles derived from essentially linear crystallisable polyamides which provides a substantially permanent modification, very resistant towards washing, scouring, dry-cleaning, and other such processes.

According to the present invention, we provide a shaped article made from an oriented synthetic crystalline polyamide having a surface which contains defined active groups which are chemically bonded through radicals, containing ester or amide linkages, to polyamide segments which segments are identical with, but not chemically combined with, polyamide segments in the shaped article and which segments are in a state of co-crystallisation with the polyamide segments comprising the outer layers of the shaped article, said active groups being selected from at least one of the following: water solvatable polyoxyalkylene groups, acidic groups comprising sulphonic acid, phosphonic acid, or carboxylic acid groups or ionisable salts thereof, groups which contain silicon- or fluorine-based water-repellent groups and polymeric groups containing a plurality of alcoholic hydroxyl radicals.

We also provide a process for providing a shaped article made from an oriented essentially linear crystallisable polyamide with a durable, modified surface, comprising subjecting the shaped article to a thermal treatment at a temperature above 40° C. and below the melting temperature of the shaped article whilst the said shaped article is in intimate contact with a water-insoluble crystallisable polymeric compound, said polymeric compound being characterised in that (A) it has a crystalline melting point above 100° C., measured by the temperature of disappearance of birefringence, (B) it contains crystallisable segments of repeat units identical with the repeat units forming the crystallisable portions of the polyamide shaped article, and (C) it contains at least one active group serving to modify the surface of the shaped article, said active group being selected from at least one of the following: water-solvatable polyoxyalkylene groups, acidic groups comprising sulphonic acid, phosphonic acid, or carboxylic acid groups or ionisable salts thereof, groups which contain silicon- or fluorine-based water-repellent groups and polymeric groups containing a plurality of alcoholic hydroxyl radicals.

Further, according to the present invention we provide a stable dispersion of a polymer in water, said dispersed polymer being a block or graft co-polymer, which contains crystalline polyamide segments and water-solvated polyoxyalkylene segments. These stable dispersions are particularly suitable for application to shaped articles such as filaments, fibres, fabrics and films made from a polymer which has repeat units which are chemically identical with the polyamide segments contained in the dispersed block or graft copolymer.

It will be appreciated that the shaped article may contain other materials besides the polyamide, for example polyamide filaments or fibres may be mixed and blended with other fibres such as wool and cotton fibres or yarns.

Suitable synthetic crystalline polyamide shaped articles includes those made wholly or predominantly from poly (hexamethylene adipamide) or poly(caproamide).

Examples of these and other crystallisable polyamides which may be treated according to our invention are described e.g. in British Patent Specification No. 461,236 and 461,237 and in U.S. Patent Specification 2,071,250, 2,071,252 and 2,130,236. They comprise fibre- and film-forming polyamides derived from poly(hexamethylene adipamide), poly(caproamide), poly(tetramethylene adipamide), poly(pentamethylene adipamide), poly(heptamethylene adipamide), poly(heptamethylene pimelamide), poly(octamethylene adipamide), poly(nonamethylene adipamide), poly(decamethylene adipamide), poly(hexamethylene sebacamide), polyamide from polypyrrolidone, polyamide from 11-amino-undecanoic acid, polyaxamides particularly from hexamethylene diamine or C-substituted diamines, polyamides derived from terephthalic or isophthalic acid with hexamethylene diamine, or meta- or para-phenylene diamine, and polyamides known by the generic names of: nylon 2, nylon 3 and C-substituted nylon 3, nylon 4, nylon 7, nylon 8, nylon 9, nylon 10, and nylon 12. We also include in polyamides the class of compounds generally known as polyureas which are polyamides formally derived from carbonic acid.

In the case of poly(hexamethylene adipamide) the crystallisable repeat unit has the structure

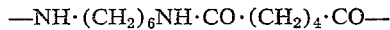

The function of the active group is to endow the polyamide shaped article with particular properties as desired such for example as low retention of static charge, surface absorption of water, specific attraction for acids or for bases, adhesion to rubber and the like.

The active group present in the crystallisable polymeric compound can be either simple or polymeric, and may be present as an end group in the molecule or may be attached to other groups at one or more than one position. Of course, more than one active group may be present in the molecule of the crystallisable compound, and other groups which confer neither crystallisability nor surface modification may also be present.

The effect of incorporating a water-solvatable polyoxyalkylene group is to render the surface of the shaped article hydrophilic and therefore wettable by water. Soil, particularly when attached to the shaped articles by oily substances is more easily displaced by water or aqueous detergents when the surface of the shaped article is rendered more hydrophilic, and the redeposition of soil from detergent media is also reduced. As a result, treated articles are washed more easily and more effectively than untreated articles. A further effect of incorporating a water solvatable polyoxyalkylene group, is to increase the ability of adhesives, gums and sizes, including textile sizes to adhere to the shaped article surface. Suitable polyoxyalkylene groups include polyoxyethylene, polyoxypropylene, and copolymers thereof.

Where the active group serving to modify the surface of the shaped article is a polyoxyethylene group, polyoxyethylene groups derived from polyoxyethylene glycols having an average molecular weight of 300–6000 are most suitable, and we particularly prefer to use polyoxyethylene groups derived from polyoxyethylene glycols having an average molecular weight in the range 1000 to 4000 inclusive. It will be appreciated that when we refer to polyoxyethylene groups derived from a particular polyoxyethylene glycol, this does not necessarily imply the use of that particular polyoxyethylene glycol in the preparation of the crystallisable polymeric compound but means that the polyoxyethylene group together with the elements of water is equivalent in molecular weight to that particular polyoxyethylene glycol; thus for example a polyoxyethylene group with a molecular weight of 282 is derived from a polyoxyethylene glycol of molecular weight 300. In practice the polyoxyethylene glycol may be converted to polyoxyethylene diamine before formation of the crystallisable polymeric compound.

It is a feature of our invention that it is not necessary that the crystallisable polymeric compound used in the treatment should itself be capable of forming shaped articles such as fibres or films, and indeed we prefer to use a crystallisable polymeric compound which is not itself capable of forming fibres, although crystallisable polymeric compounds which are capable of forming shaped articles can be used.

It is a particularly useful feature of those crystallisable polymeric compounds wherein water-solvatable polyoxyalkylene groups are present as active groups, that they readily form stable dispersions in water, and that such dispersions are stable without addition of any conventional dispersing agent. A suitable and easy method of forming such dispersions is to run the crystallisable polymeric compound in the molten form into vigorously agitated water. In the case where the water-solvatable polymeric group is a polyoxyethylene group the temperature of the water should be carefully controlled during and after addition of the molten crystallisable polymeric compound, in order to obtain fluid dispersions of high solids content.

The effect of incorporating an acidic group as an active group in the crystallisable polymeric compound is to render the surface of the shaped article receptive to basic materials such as basic polymers and copolymers or basic dyestuffs. Acidic groups may be incorporated in the crystallisable polymeric compound in the form of their ionisable salts instead of as the un-neutralised acid.

The acidic group or salt thereof may be a relatively weak acid or a salt of a relatively weak acid, such as a carboxylic acid, or it may be a relatively strong acid or a salt of a relatively strong acid, such as a sulphonic or phosphonic acid. Strong acids and their salts are particularly effective in modifying the surface properties of shaped articles.

The acidic group or salt thereof may be derived from a monomeric material; thus for example the crystallisable compound may contain acidic end-groups, such a p-sulphobenzoic amide groups, or acidic difunctional groups such as 5-sulphoisophthalic amide groups. The acid group or salt thereof may be derived from a polymeric material, such as poly(hexamethylene 5-sulphoisophthalamide). The crystallisable compound may be a block or graft copolymer.

Silicon and fluorine-based water-repellent groups suitable for use as active groups comprise polymeric silicone groups and polymeric fluorocarbon groups derived from silicone polymers or fluorocarbon polymers having an average molecular weight of at least 300.

A single crystallisable polymeric compound of definite molecular weight may be employed; however, it is much more convenient to prepare and use a mixture of crystallisable polymeric compounds of varying molecular weight such as is obtained by condensation polymerisation of the precursors of the crystallisable repeat units with precursors of the active groups, or by degradation of preformed crystallisable polyamide with a precursor of an active group.

The crystallisable polymeric compound may be a linear polymer or a branched-chain polymer. In the case where it is a branched-chain polymer, branching is obtained by incorporating chain-branching sites into groups which are derived from copolymerisable compounds having a functionality of three or more. By the functionality of a compound we mean the number of reactive functional groups per molecule. Thus a compound having three reactive functional groups per molecule is said to be trifunctional, or to have a functionality of three. Bis-hexamethylenetriamine and trimesic acid are examples of trifunction compounds suitable for use in the preparation of branched crystallisable polymeric compounds by condensation polymerisation. Polymeric copolymerisable compounds having a functionality of three or more may be employed to introduce branched chains, and these may also contain active groups, as is the case with glycerol—ethylene oxide or pentaerythritol—ethylene oxide condensates with amino end groups which have functionalities of 3 and 4 respectively.

The crystallisable polymeric compound may be a random copolymer, or it may be a block copolymer, or it may be a graft copolymer. In general, where the active group is itself polymeric, the crystallisable polymeric compound will be a block or graft copolymer, and where the active group is not polymeric the crystallisable polymeric compound will usually be a random copolymer, but may alternatively be a block or graft copolymer. Where the active group is not polymeric and appears only as end-groups in the crystallisable polymeric compound, the crystallisable polymeric compound is not strictly a copolymer at all, but rather a homopolymer with active end-groups.

It is of course possible to apply a crystallisable polymeric compound containing more than one active group, or to apply together or consecutively two or more crystallisable polymeric compounds containing different active groups.

The crystallisable polymeric compound or compounds may be applied to the shaped article as molten material, or as a solution in a plasticiser for the polyamide being treated, or as a solution in a solvent with does not plasticise the polyamide being treated, or as a suspension or dispersion of the compound or compounds in a liquid medium. A particularly simple method of applying the compound or compounds is from a dispersion in water or an aqueous medium, and this is a particularly preferred method of application.

In another preferred from of the invention the treatment of the polyamide article compound may be combined with a dyeing treatment of the polyamide article such as incorporation of a dyestuff or an optical whitener into an aqueous dispersion of the crystallisable compound.

It will be appreciated that although it is essential for the purposes of this invention that the polymeric compound by crystallisable, it is not essential that the polymeric compound be applied to the surface of the shaped article in a crystalline form. Thus where the crystallisable polymeric compound is applied in molten or dissolved form, it is not crystalline during the application. Similarly, although it is essential for the purpose of this invention that the shaped article contain or comprise an essentially linear crystallisable polyamide, it is not essential that the crystallisable polymeric compound be applied to the surface while the shaped article is in the crystalline form. In such cases, of course, it is necessary for crystallinity to be developed in the crystallisable polymeric compound and in the shaped article subsequent to the application.

In order to produce a durable surface treatment it is essential to heat the compound in contact with the surface of the shaped article. Where a solution or dispersion of the crystallisable polymeric compound is used, the solvent or continuous phase may be removed by the same or by a previous thermal treatment, or may be allowed to evaporate before thermal treatment. The compound may also be applied directly from a continuous phase, for example by using techniques normally applied for dyeing with disperse dyestuffs. The temperature required to produce a durable surface treatment is above 40° C. and preferably the temperature should exceed 150° C. Obviously, the temperature should not be so high as to melt or damage the shaped article, so temperatures above the melting point of the shaped article can only be applied for very short times.

It is useful, particularly when the active group or groups is affected by atmospheric oxygen at the temperature of the thermal treatment, to carry out the thermal treatment with an anti-oxidant present. This anti-oxidant may be dissolved or dispersed in the treating composition.

The presence of an anti-oxidant is particularly important where polyoxyalkylene groups are present as active groups. Many classes of compound have been disclosed as anti-oxidants suitable for stabilising polyethers, and these are generally effective for stabilising polyoxyalkylene active groups during the surface treatment. In considering those most suitable in the present application it is necessary to satisfy the criteria that the anti-oxidant should be stable and effective at the temperatures employed in the thermal treatment and that it should produce no undesirable colour or odour. For example, Santonox R, bis-2-methyl-4-hydroxy-6-tert.-butylphenyl sulfide or Irganox 858 are preferred to pyrogallol or zinc diethyldithiocarbamate since they produce no discolouration. A combination of two or more anti-oxidants may give better results than either anti-oxidant alone. Thus, for example, a mixture of zinc dinonyldithiocarbamate with 2-α-methylcyclohexyl - 4,6 - dimethylphenol is more effective than either anti-oxidant used alone.

The presence of one or more antioxidants to stabilise the polyamide segments in the crystallisable polymeric compound is also desirable. Suitable antioxidants include, for example, those disclosed in the following British patent specifications: 722,724, 839,067.

A cross-linking agent or a catalyst promoting cross-linking, may be present during the treatment of the polyamide shaped article with the crystallisable polymeric compound.

APPENDIX I

The polyamide shaped articles such as filaments and films are subjected to a process of drawing after extrusion or meltspinning, which brings about a molecular orientation in the shaped articles and imparts improved properties, such as increased tensile strength. The degree of orientation may be determined by measuring the fibre birefringence of filaments or the principle refractive indices of filaments or film. The degree of orientation may be estimated, for example in the case of filaments, by the ratio of observed birefringence to the theoretical maximum for a prefectly oriented sample. In the case of nylon 6,6, the theoretical maximum is of the order 0.060. The degree of orientation should be at least 0.75 and preferably equal to or greater than 0.83.

The following examples in which all parts and percentages are by weight, except where stated otherwise, illustrate but do not limit our invention.

EXAMPLE 1

A solution of adipoyl chloride (81 parts), and acetyl chloride (10 parts) dissolved in methylene chloride (2000 parts) was slowly added to hexamethylene diamine (113 parts) poly (oxyethylene) diamine of average molecular weight 1540 (154 parts) and sodium hydroxide (56 parts) dissolved in water (1,500,000 parts) and during the addition, of the adipoyl and acetyl chlorides in methylene chloride, subjected to vigorous agitation by means of a homogeniser, agitation being continued for 15 minutes after the addition of solution was completed. The suspension was then heated on a steam bath to remove the methylene chloride, filtered, washed with water, and dried under vacuum at 60° C. A sample heated on a hot-stage microscope melted (as shown by final loss of crystallinity), over a range up to 260° C.

A 10% aqueous dispersion of this compound to which an anti-oxidant, Santonox R (0.5% by weight based on the dispersed solids) was added as a 50% w./v. solution in polyethylene glycol 200, was used as a padding bath through which a 100% poly (hexamethylene adipamide) plain weave taffeta was padded, the fabric then being heated, by passing through a pin stenter, at 200° C. for 30 seconds. The lengthwise resistances of 7" x 1½" samples of treated and untreated fabrics were measured at 65% Relative Humidity. The treated fabrics were then subjected to a series of 20 wash-dry cycles, each consisting of a 6 minute wash in a 0.07% solution of a commercial soap powder at 60° C. in a washing machine, rinsing in water, three spin-dry treatments, and drying in a hot air tumbler drier at 60° C. After the twentieth wash-dry cycle, the fabrics were rinsed in water of conductivity $1.5 \times 10^{-3}$ ohms, spin-dried for 2 minutes, and tumble-dried at 60° C. The lengthwise electrical resistances of samples 7" x 1½" were measured at 65% Relative Humidity. The following results were obtained:

| | Resistance (ohms) |
|---|---|
| Untreated fabric | $3.5 \times 10^{12}$ |
| Treated fabric unwashed | $3.2 \times 10^{10}$ |
| Treated fabric, after 20 wash-dry cycles | $5.2 \times 10^{11}$ |

The treated fabric, after 20 wash-dry cycles, when rubbed against another poly (hexamethylene adipamide) fabric developed no stable electrostatic charge, whereas a similar untreated fabric developed a heavy electrostatic charge which persisted for many seconds and caused dust, dirt, and ash to be attracted to the surface. The treated washed fabric, was also readily wetted by water, and oil was displaced by water from the fabric.

EXAMPLE 2

Adipoyl chloride (81 parts) dissolved in methylene chloride (2000 parts) was slowly added to a solution of hexamethylene diamine (91.4 parts), poly (oxyethylene) diamine of average molecular weight 1540 (308 parts) and sodium hydroxide (56 parts) in water (1,500,000 parts). The addition of the methylene chloride solution was accompanied by vigorous agitation provided by a homogeniser, agitation being continued for 15 minutes after the addition of solution was completed. The suspension was then heated on a steam bath to remove the methylene chloride; filtered, washed with water, and dried under vacuum at 60° C. A sample heated on a hot stage microscope melted (as shown by loss of crystallinity) over a range up to 252° C. The product was dispersed in water by means of a homogeniser and "Santonox R" added to the dispersion as described in Example 1. 100% poly(hexamethylene adipamide) plain weave fabric was treated with a 10% dispersion so prepared as described in Example 1. The treated fabric subjected to 40 wash-dry cycles, as described in Example 1, developed no appreciably stable electrostatic charge when rubbed and was accordingly resistant to soiling. The treated washed fabric was also wetted by water, and oil was readily removed by water from the fabric. The treated fabric, so subjected to 40 wash-dry cycles and conditioned as in Example 1 had a lengthwise (7" x 1½" sample) electrical resistance of $4.8 \times 10^{11}$ ohms.

EXAMPLE 3

This example illustrates the preparation of a poly(hexamethylene adipamide)-poly(oxyethylene) adipamide copolymer by a melt polymerisation technique and its application to poly(hexamethylene adipamide) fabric to give protection from static and improved ease of washing.

Hexamethylene diamine (81 parts) and poly(oxyethylene) diamine of average molecular weight 1540 (308 parts) dissolved in methanol (1500 parts) were added to a concentrated solution of adipic acid (131 parts) in methanol. The mixture was then heated in a current of nitrogen to distil off the methanol, and the residue was polymerised at 282° C. for 40 minutes at 6 mm. pressure in an atmosphere of nitrogen. A sample of the compound heated on a hot stage microscope melted (as shown by loss of crystallinity) over a range up to 246° C. The product was dispersed in water by means of a homogeniser to give a 10% aqueous dispersion. An anti-oxidant, Santonox R (Monsanto), (0.5% by weight based on the dispersed solids) was added as a 50% w./v. solution in polyethylene glycol 200 to this dispersion.

The antioxidant containing dispersion was used as a pading bath through which a 10% poly(hexamethylene adipamide) plain weave taffeta fabric was padded to give 3% by weight of copolymer on the fabric, the fabric then being heated, by passing through a pin stenter, at 200° C. for 30 seconds. The lengthwise resistance of 7" x 1½" samples of treated and untreated fabrics were measured at 65% Relative Humidity. The treated fabrics were then subjected to a series of 40 wash-dry cycles, each consisting of a 6 minute wash in a 0.07% solution of a commercial soap powder (Persil, registered trademark) at 60° C. in a washing machine, rising in water, three spin-dry treatments, and drying in a hot air tumbler drier at 60° C. After the fortieth wash-dry cycle the fabrics were rinsed in water, containing 1.5 g./l. of potassium bromide, of conductivity $1.5 \times 10^{-3}$ ohms, spin-dried for 2 minutes, and tumble dried at 60° C. The lengthwise electrical resistances of samples 7" x 1½" were measured at 65% Relative Humidity. The following results were obtained:

|  | Resistance (ohms) |
| --- | --- |
| Treated fabric, unwashed | $1.7 \times 10^{10}$ |
| Treated fabric, after 40 wash-dry cycles | $1.85 \times 10^{11}$ |
| Untreated fabric (comparison) | $3.5 \times 10^{12}$ |

The treated fabric, after 40 wash-dry cycles, when rubbed against another poly(hexamethylene adipamide) fabric developed no stable electrostatic charge, whereas a similar untreated fabric developed a heavy electrostatic charge which persisted for many seconds and caused dust, dirt, and ash to be attracted to the surface. The treated washed fabric, was also readily wetted by water, and oil and oily soil were displaced from the fabric by water more readily than from the untreated fabric.

EXAMPLE 4

This example illustrates the preparation of a poly(hexamethylene adipamide)-poly(oxyethylene) adipamide copolymer by the technique of interfacial poly-condensation and its application to poly(hexamethylene adipamide) fabric to give protection from static. It further illustrates the benefits to be gained by inclusion of a polyamide anti-oxidant system in the treating dispersion.

A solution of adipoyl chloride (10 parts) dissolved in methylene chloride (200 parts) was slowly added to hexamethylene diamine (3.8 parts), poly (oxyethylene) diamine (33.7 parts) and sodium hydroxide (4.4 parts) dissolved in water (1400 parts). During the addition, the mixture was subjected to vigorous agitation by means of a homogeniser, agitation being continued for 15 minutes after the addition of solution was completed. The suspension was then heated on a steam bath to remove the methylene chloride, filtered, washed with water, and dried under vacuum at 60° C. A sample heated on a hot stage microscope melted (as shown by final loss of crystallinity) over a range up to 260° C. The compound had a Viscosity Ratio (1% solution in concentrated sulphuric acid) of 1.21 at 25° C.

A 10% aqueous dispersion of the above copolymers was prepared by dispersing the solid in water, containing 0.01% by weight of sodium lauryl sulphate, using an homogeniser. The particle size of the dispersion was further reduced by gravel milling the dispersion for 24 hours. An antioxidant, Santonox R (Monsanto), (0.5% by weight based on the dispersed solids) was added as a 50% w./v. solution in polyethylene glycol 200 to the dispersion.

A 100% poly(hexamethylene adipamide) plain weave fabric was treated with this dispersion as described in Example 1 to give treated sample A.

To 100 parts of the dispersion were added, with vigorous agitation, the following salts, separately, dissolved in a small a quantity of water as possible: copper acetate (0.03 part), potassium iodide (1.0 part), and sodium dihydrogen phosphate (0.25 part). These salts together constitute a polyamide antioxidant system. A 100% poly(hexamethylene adipamide) plain weave fabric was treated with this dispersion as described in Example 1 to give treated sample B.

Treated samples A and B were subjected to 20 wash-dry cycles as described in Example 1. The treated samples A and B, subjected to 20 wash-dry cycles and conditioned as described in Example 1 had lengthwise (7" x 1½" samples) electrical resistance of $1.8 \times 10^{11}$ ohms and $6.4 \times 10^{9}$ ohms respectively.

This clearly demonstrates the improved antistatic effect obtained by inclusion of a polyamide antioxidant system in the treating dispersion.

EXAMPLE 5

This example illustrates the effect on wash-durability and effectiveness of varying the molar proportions of the reactants in preparing copolymers of poly(hexamethylene adipamide) and poly(oxyethylene) adipamide for the treatment of poly(hexamethylene adipamide) fabrics.

Adipoyl chloride, hexamethylene diamine, and poly (oxyethylene) diamine of average molecular weight 1540 were subjected to interfacial polycondensation conditions in the presence of methylene chloride, water, and sodium hydroxide as set out in Example 2. Proportions such as to produce copolymers of hexamethylene adipamide poly(oxyethylene) adipamide molar ratios of 7:2, 5:2, 3:2, were used. These products were dispersed in water and applied as in Example 1 but with "Santonox R," copper acetate, potassium iodide, and sodium dihydrogen phosphate as antioxidants as set out in Example 4, to 100% poly(hexamethylene adipamide) fabric which was then heated at 200° C. for 30 seconds. The treated fabrics were subjected to 10, 20, and 40 wash-dry cycles and conditioned as in Example 1. The data for the copolymers and the electrical resistances of 7" x 1½" samples at 65% Relative Humidity are presented in tabular form below:

| Molar Ratio hexamethylene adipamide: poly (oxyethylene) adipamide | Crystalline, melting point, °C. | Viscosity Ratio (1% solution in concentrated sulphuric acid) | Electrical resistance of treated fabric (ohms) after— | | |
|---|---|---|---|---|---|
| | | | 10 washes | 20 washes | 40 washes |
| 3:2 | 225 | 1.18 | $2.4 \times 10^9$ | $6.4 \times 10^9$ | $7.4 \times 10^{10}$ |
| 5:2 | 220 | 1.21 | $2.3 \times 10^9$ | $1.3 \times 10^{10}$ | $1.1 \times 10^{11}$ |
| 7:2 | 224 | 1.25 | $1.6 \times 10^{10}$ | $4.9 \times 10^{10}$ | $6.9 \times 10^{11}$ |

These results show that, in the range studied, the copolymer containing the largest proportion of poly(oxyethylene) units, namely the one of molar ratio 3:2, is the most effective antistatic agent.

EXAMPLE 6

This example illustrates the preparation of a copolymer from caprolactam and poly(oxyethylene) diamine of average molecular weight 1540 and its application to a 100% poly(caproamide) fabric.

Caprolactam (31.6 parts), poly(oxyethylene) diamine of average molecular weight 1540 (30.8 parts), adipic acid (2.9 parts) and water (50 parts) were placed in a sealed tube and heated in a furnace at 220° C. for 45 minutes. The resulting solution was placed in a flask and the contents heated, under a stream of nitrogen, at 220° C. for 2 hours. Water was distilled off during the heating up period. The molten copolymer, so produced, was poured into 250 parts of vigorously agitated water to give a dispersion containing 5% w./v. solids. A portion of the solid compound heated on a hot stage microscope melted (as shown by loss of crystallinity) over a range up to 185° C. The compound had a Viscosity Ratio (1% solution in concentrated sulphuric acid) of 1.22 at 25° C.

Antioxidants were added to the 5% aqueous dispersion as follows. An antioxidant, bis(2-hydroxy-3-α-methylcyclohexyl-5-methylphenyl)methane, (0.5% by weight based on the dispersed solids) was added as a 30% w./v. solution in Lissapol NX. To 2000 parts of this dispersion were then added the following salts, separately, with vigorous agitation dissolved in as small a quantity of water as possible: copper acetate (0.03 part), potassium iodide (1.0 part), and sodium dihydrogen phosphate (0.25 part). A 100% poly(caproamide) plain weave fabric was treated with the 5% aqueous dispersion so prepared, as described in Example 1. The treated fabric subjected to 20 wash-dry cycles, as described in Example 1, developed no appreciable electrostatic charge when rubbed and was accordingly resistant to soiling. The treated washed fabric was also wetted by water, and oil was readily removed by water from the fabric. The treated fabric, so subjected to 20 wash-dry cycles and conditioned as in Example 1 had a lengthwise (7" x 1½" sample) electrical resistance of $1.3 \times 10^{11}$ ohms, compared with $3.6 \times 10^{12}$ ohms for untreated fabric.

What we claim is:
1. A shaped article made from an oriented synthetic essentially linear crystalline polyamide which is provided with a surface structure containing active groups, said active groups being chemically bonded through radicals containing amide linkages to polyamide segments whose repeat units are identical with, but not chemically combined with, the repeat units constituting the crystalline segments of the internal structure of the shaped article and which are attached to the internal structure of the shaped article by co-crystallization with the polyamide segments comprising the outer portion of the internal structure of the shaped article, said active groups being water solvatable polyoxyalkylene groups having a molecular weight of 1000 to 4000.

2. A process for providing a shaped article made from an oriented synthetic essentially linear crystalline polyamide which is provided with a surface structure containing active groups, said active groups being chemically bonded through radicals containing amide linkages to polyamide segments whose repeat units are identical with, but not chemically combined with, the repeat units constituting the crystalline segments of the internal structure of the shaped article and which are attached to the internal structure of the shaped article by co-crystallization with the polyamide segments comprising the outer portion of the internal structure of the shaped article, said active groups being water solvatable polyoxyalkylene groups having a molecular weight of 1000 to 4000, comprising:

subjecting a shaped article of essentially linear crystallizable polyamide to a thermal treatment at a temperature above 40° C. and below the melting temperature of the shaped article while the said shaped article is in intimate contact with a water-insoluble crystallizable polymeric compound,
said polymeric compound being characterized in that (A) it has a crystalline melting point above 100° C., measured by the temperature of disappearance of birefringence, (B) it contains crystallizable segments of repeat units identical with the repeat units forming the crystallizable portions of the polyamide shaped article, and (C) it contains at least one active group linked to the crystallizable segments in (B) by groups containing amide linkages, said active groups serving to modify the surface of the shaped article, said active group being water solvatable polyoxyalkylene groups having a molecular weight of 1000 to 4000.

References Cited

UNITED STATES PATENTS

| 2,359,876 | 10/1944 | Martin. | |
|---|---|---|---|
| 2,708,617 | 5/1955 | Magat et al. | |
| 3,044,987 | 7/1962 | Schaefgen et al. | 260—75 |
| 3,078,138 | 2/1963 | Miller et al. | 8—128 |

DONALD LEVY, Primary Examiner

U.S. Cl. X.R.

8—31, 100, 168, 171, 173, 178; 117—161; 260—78, 857